(12) United States Patent
Takahashi et al.

(10) Patent No.: US 6,172,779 B1
(45) Date of Patent: Jan. 9, 2001

(54) OPTICAL PICKUP DEVICE INCLUDING A HOLOGRAM LENS SECTION WITH AN OVAL DIFFRACTION GRATING PATTERN

(75) Inventors: Shinichi Takahashi; Masayuki Koyama, both of Tokorozawa (JP)

(73) Assignee: Pioneer Electronic Corporation, Tokyo (JP)

(*) Notice: Under 35 U.S.C. 154(b), the term of this patent shall be extended for 0 days.

(21) Appl. No.: 09/519,985

(22) Filed: Mar. 7, 2000

Related U.S. Application Data

(62) Division of application No. 09/005,808, filed on Jan. 12, 1998, now Pat. No. 6,055,076.

(30) Foreign Application Priority Data

Jan. 28, 1997 (JP) ................................................ 9-14162

(51) Int. Cl.[7] .............................. G02B 5/32; G02B 5/18; G11B 7/12
(52) U.S. Cl. .............................. 359/16; 359/19; 359/565; 359/571; 359/574; 359/369; 359/44.23; 359/112
(58) Field of Search .................................... 359/15, 16, 19, 359/565, 574, 571, 569, 566; 369/44.23, 44.12, 109, 112

(56) References Cited

U.S. PATENT DOCUMENTS

| | | | |
|---|---|---|---|
| 5,107,477 | * 4/1992 | Fujita et al. | 369/44.24 |
| 5,361,244 | * 11/1994 | Nakamura et al. | 369/44.23 |
| 5,377,177 | * 12/1994 | Horinouchi et al. | 369/112 |
| 5,473,471 | * 12/1995 | Yamagata et al. | 359/569 |
| 5,490,133 | * 2/1996 | Nakamura et al. | 369/44.23 |
| 5,835,283 | * 11/1998 | Yamanaka | 359/719 |
| 5,838,496 | * 11/1998 | Murayama et al. | 359/565 |
| 5,920,537 | * 7/1999 | Komma et al. | 369/112 |

OTHER PUBLICATIONS

Japanese Patent Application Kokai No. 7-98431—an English translation of the Abstract.

* cited by examiner

*Primary Examiner*—Jon Henry
(74) *Attorney, Agent, or Firm*—Perman & Green, LLP

(57) ABSTRACT

A two-focal-point pickup device capable of suppressing the generation of glitch or bump in reproduced signal. The optical pickup device irradiates a light beam emitted from a light source onto an optical recording medium to form a light spot on a track of a recording surface of the optical recording medium to read the optical recording medium while controlling the position of the light spot relative to the track of the recording surface. The optical pickup device includes a converging lens section coaxially disposed in an optical axis of the light beam to converge the light beam onto the recording surface; and a hologram lens section coaxially disposed in the optical axis of the light beam to diffract the light beam. The hologram lens section has a diffraction grating pattern being formed in such a manner that a first-order diffraction light of the light beam caused by the hologram lens section and converged on the recording surface has a first numerical aperture existing in a direction intersecting the track extending direction and a second numerical aperture existing in the track extending direction. The first numerical aperture is less than the second numerical aperture. The hologram lens section has a diffraction grating pattern including a parallel-line diffraction grating pattern and two semicircular diffraction grating patterns.

2 Claims, 7 Drawing Sheets

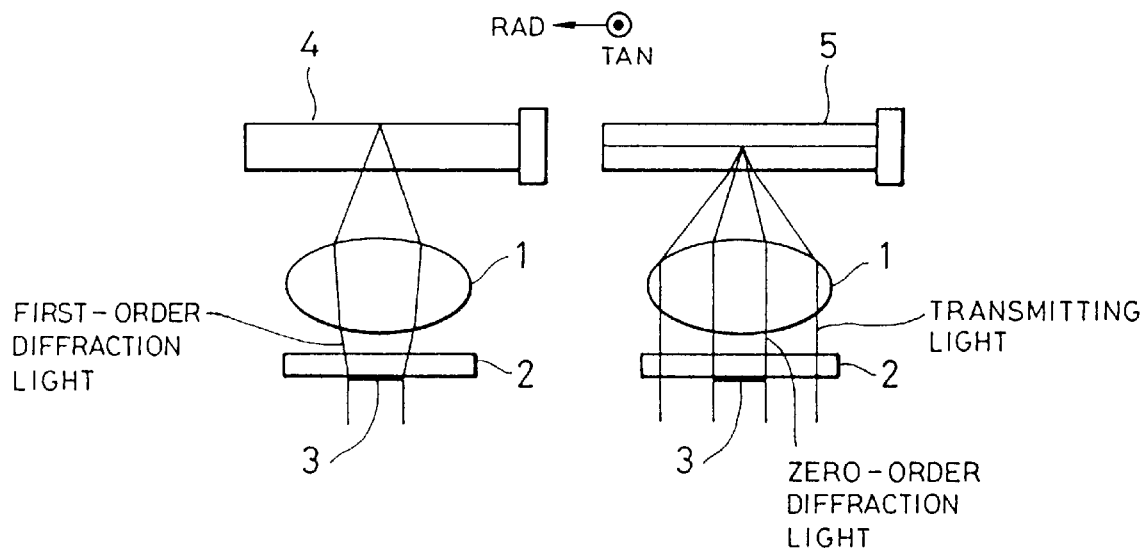
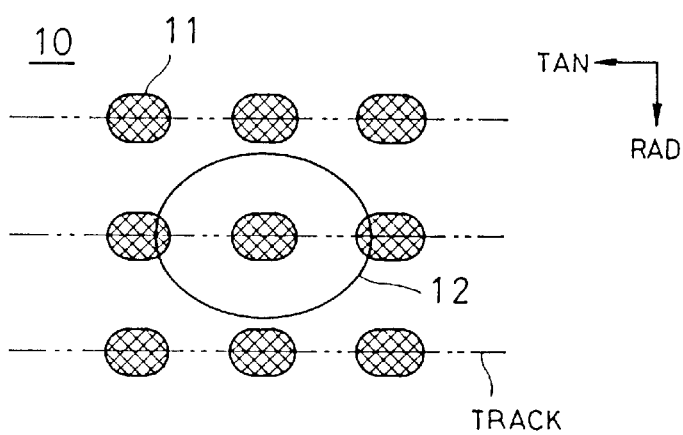

OPTICAL PICKUP DEVICE INCLUDING A HOLOGRAM LENS SECTION WITH AN OVAL DIFFRACTION GRATING PATTERN

This application is a divisional of U.S. Application No. 09/005,808, filed Jan. 12, 1998 now U.S. Pat. No. 6,055,076.

BACKGROUND OF THE INVENTION

1. Field of the Invention

The present invention relates to an optical pickup device or optical head device and particularly to an optical system of an optical pickup device in an optical recording and reproducing apparatus.

2. Description of the Related Art

There have been known as optical information recording mediums, various kinds of optical discs, called Laser Disc (LD), Compact Disc (CD) and Digital Video Disc (DVD). Such optical discs are standardized respectively in different specifications such as a base thickness of the substrate and the like. An optical disc having a multi-layered structure provided in a DVD specification comprises many laminated recording layers having effective thicknesses different from each other. Moreover, the most suitable numerical aperture (NA) of a reading objective lens is different among the different optical discs.

For example, a compatible player capable of reading out recording information from both the CD and DVD is required in the market. There are the following differences between optical systems for reading out the recording information on the CD and the DVD.

(1) The difference of numerical apertures NA: the numerical aperture for the CD is 0.37 and for the DVD the numerical aperture is 0.6.

(2) The difference of base thicknesses from a recording surface (reflection surface) to an outer surface of the optical disc: the base thickness for the CD is 1.2 mm and for the DVD the base thickness is 0.6 mm.

Consequently, these differences must be canceled to achieve the optical pickup device for the CD/DVD compatible player.

To achieve such compatible players, it is often thought that an objective lens having two focal points should advantageously be employed.

Specifically, an objective lens having a single focal point has a numerical aperture most suitable for one optical disc, the numerical aperture being improper for the other optical disc. For the other optical disc, such objective lens produces an aberration such as a spherical aberration.

As an example, a two-focal-point pickup device using a hologram lens has been disclosed in Japanese Patent Application Kokai NO. 7-98431/1995. This two-focal-point pickup device includes a complex objective lens which is composed of a convex objective lens 1 and a hologram lens 2 for reading the different optical discs, as shown in FIGS. 1A and 1B. In the hologram 2, a plurality of diffraction grooves 3 are formed over the region corresponding to the numerical aperture for the CD. A light beam is diffracted by these diffraction grooves 3, so that it is mainly divided into a zero-order diffraction light and a first-order diffraction light. Thus, respective incident angles of light onto the objective lens 1 are made different, whereby each focal point is formed on corresponding one of recording surfaces of the optical discs. At this time, the light beam is allowed to transmit as it is through the region where no diffraction groove is formed, without being diffracted, and this transmitted light is collected by the objective lens 1 together with the zero-order diffraction light. As a result, there will be different in the numerical aperture between the transmitted light and the zero-order diffraction light, and the first-order diffraction light. As shown in FIG. 1A, only the first-order diffraction light diffracted by the diffraction grooves 3 is employed for reading the CD 4 of the small numerical aperture. As shown in FIG. 1B, the transmitted light and the zero-order diffraction are employed for reading the DVD 5 of the large numerical aperture. As seen from these figures, the hologram lens functions as a concave lens for the first-order diffraction light beam in this complex objective lens for reading the optical disc. This is because a plurality of diffraction grooves 3 or ring-shaped concave and convex portions are evenly formed on a transparent flat plate over the region corresponding to the numerical aperture for the CD.

On the other hand, the semiconductor laser emitting a divergent light beam in the CD/DVD compatible player is generally used as a light source in the optical pickup device. The far field pattern of the light beam has an elliptic cross sectional intensity having a major longitudinal axis extending in the direction perpendicular to the junction interface of the semiconductor laser while radiating light with a radiating angle θ in relation of $\theta\perp > \theta\|$. In other words, the light beam from the semiconductor laser has a width of the vertical traversal mode smaller than the horizontal traversal mode. In addition, the signal reproduction from DVD has a tendency of the increase of cross-talk caused by the adjacent tracks in the reproduced signal in comparison with the conventional CD, since the track-pitch of the recording pits of the DVD is narrower than that of the CD. In the view of this tendency, the semiconductor laser for DVD is generally disposed in the optical pickup device in such a manner that its horizontal traversal mode corresponds to the track extending direction (also referred to as a tangential direction) of the optical disc, and its vertical traversal mode corresponds to the radial direction of the optical disc. Therefore, as shown in FIG. 2, the light spot 12 for DVD caused by the light beam converged on a series of the pits 11 of the recording surface 10 of the optical disc becomes an ellipse extending in the tangential direction.

Since only one light beam emitted from a single semiconductor laser is converged by the common complex objective lens to be commonly used for the reproduction of CD and DVD in the two-focal-point pickup device, a light spot 13 for reading CD in the first-order diffraction light has an elliptic shape extending in the tangential direction as well as a light spot 12 for reading DVD as shown in FIGS. 2 and 3.

In order to precisely reproduce data from the DVD of a high recording density in the CD/DVD compatible player, it is necessary to employ the semiconductor laser emitting light with a short wavelength from 630 to 680 nm less than the 780 nm wavelength of the conventional. For this, the numerical aperture of the objective lens for reading the CD used in the CD/DVD compatible player will be set a value rather smaller than that of the conventional CD player. In fact, the numerical aperture for CD is set a little value larger than a numerical aperture decided in proportion to the used wavelength in the two-focal-point pickup device to avoid the reduction of light intensity depending on the first-order diffraction light and the small numerical aperture. Therefore, a light spot 13 is formed on the recording surface 10 of the CD by the two-focal-point pickup device in such a manner that the diameter of beam west of the formed light beam 13 is reduced less than the conventional light spot size used for reading the CD as shown in FIG. 3.

In this case, if the first-order diffraction light is converged as the light spot 13 on a long pit 11 of a series of pits as corresponding to binary digit data "1001110" formed on the CD as shown in FIG. 4, then a glitch or bump A occasionally occurs in the signal intensity curve of the output from the optical pickup device, resulting in a problem that a good signal is not obtained.

SUMMARY OF THE INVENTION

The present invention has been made in view of the problem mentioned above, and its object is to provide a two-focal-point pickup device capable of suppressing the generation of glitch or bump in reproduced signal during the playback of CD.

According to the invention, an optical pickup device irradiating a light beam emitted from a light source onto an optical recording medium to form a light spot on a track of a recording surface of the optical recording medium to read the optical recording medium while controlling the position of the light spot relative to the track of the recording surface, comprises;

a converging lens section coaxially disposed in an optical axis of the light beam to converge the light beam onto the recording surface; and a hologram lens section coaxially disposed in the optical axis of the light beam to diffract the light beam, wherein said hologram lens section has a diffraction grating pattern being formed in such a manner that a first-order diffraction light of the light beam caused by said hologram lens section and converged on said recording surface has a first numerical aperture existing in a direction intersecting the track extending direction and a second numerical aperture existing in the track extending direction wherein the first numerical aperture is less than the second numerical aperture.

The above object is accomplished by the optical pickup device above mentioned in which, when CD is played, the numerical aperture NA in the radial direction of the CD decreases so as to form a light spot with an anisotropic light intensity distribution for expanding the intensity around the pit in the radial direction. Therefore, the invention prevents the generation of glitch or bump in reproduced signal during the playback of CD, without any increase of the number of optical parts in the light pickup device.

The hologram lens section in the light pickup device for reading the optical recording medium has an anisotropic diffraction grating pattern different in the radial and tangential directions selected from an elliptic pattern, an oval pattern, a double side cut circular pattern and the like to expand the light intensity distribution of the light spot in the radial direction of the optical disc.

BRIEF DESCRIPTION OF THE DRAWINGS

FIGS. 1A and 1B are schematic constructional diagrams showing two-focal-point complex objective lens for reading different optical recording mediums respectively;

FIG. 2 is an enlarged plan view showing the recording surface of a DVD;

DESCRIPTION OF THE PREFERRED EMBODIMENTS

Embodiments of the present invention will now be described below with reference to the accompanying drawings.

Figure 5:
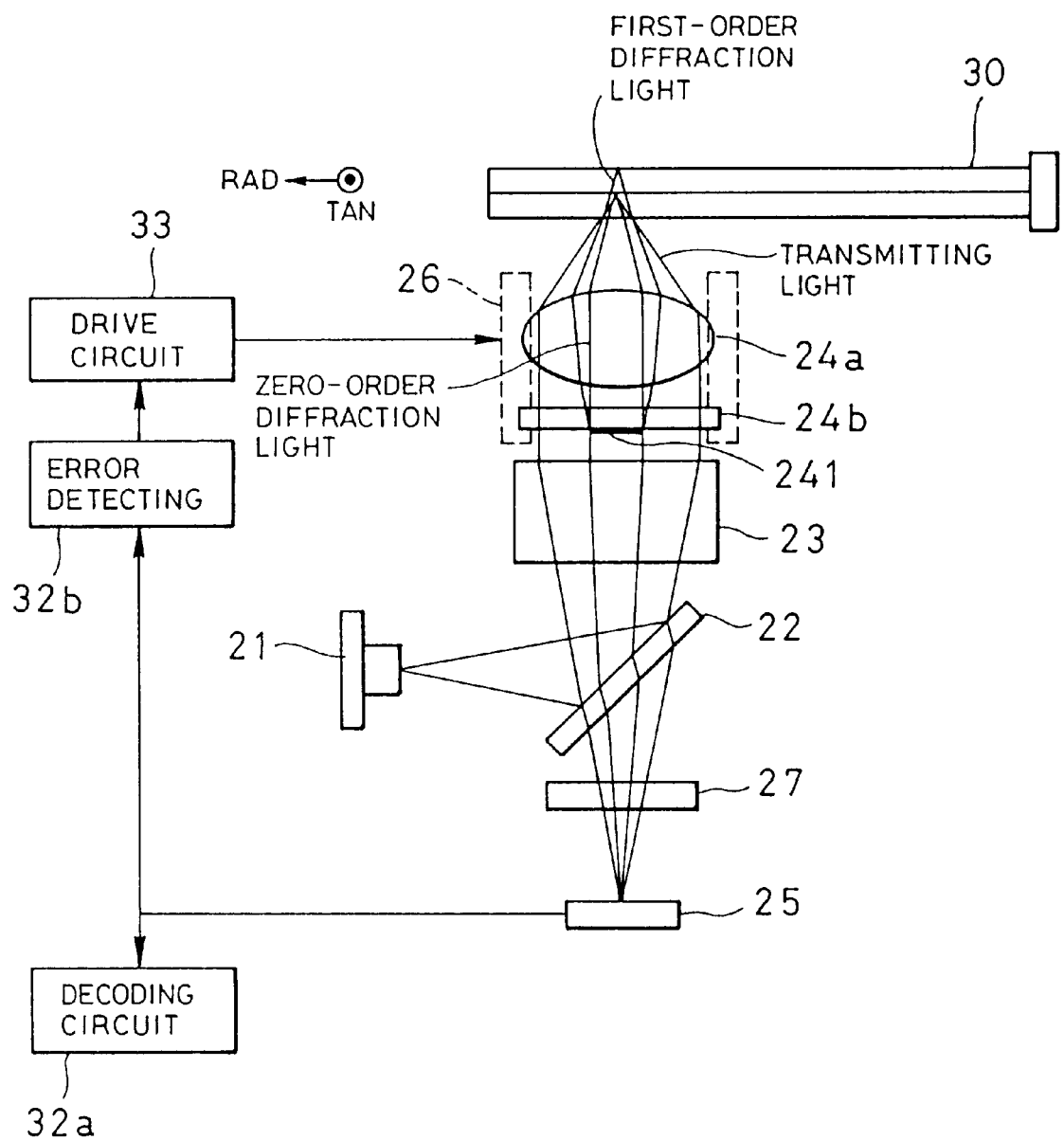
FIG. 5 is a schematic constructional diagram showing an optical pickup device of an embodiment comprising a two-focal-point complex objective lens for reading an optical recording medium.

FIG. 5 schematically shows an optical pickup device of an embodiment according to the invention comprising a two-focal-point complex objective lens for reading an optical recording medium or LD, CD, DVD, CD-R and the like. In a body of the optical pickup device, a semiconductor laser 21 of a light source, a half mirror 22, a collimator lens 23 for converting a light beam to a parallel ray, a complex objective lens 24 for converging the light beam onto an optical disc 30 to form a light spot to read the optical recording medium, and a photodetector 25 for receiving light reflected from the light spot are provided. The complex objective lens 24 comprises a converging lens section 24a of a convex lens for converging the incident light beam on the optical disc, and a hologram lens section 24b of a diffraction grating pattern formed as a Fresnel lens on a transparent flat plate which functions as a concave lens for a first-order diffraction light. The diffraction grating pattern of the hologram lens is a plurality of diffraction grooves of ring-shaped concave and convex portions which are concentrically formed on the transparent flat plate over the region corresponding to a specific numerical aperture for the CD specification and arranged coaxially with the optical axis of the converging lens. The converging lens section 24a and the hologram lens section 24b are arranged to a cylindrical holder so as to be away from each other at a predetermined distance and parallel to each other.

In addition, the body of the optical pickup device accommodates an objective-lens driving mechanism 26 including a tracking actuator and a focusing actuator. The focusing actuator allows the complex objective lens 24 to move in the direction perpendicular to the information recording surface of the optical disc 30 for reading it. The tracking actuator allows the complex objective lens 24 to move in the radial direction of the optical disc 30. Furthermore, a receiving optics system 27 is disposed at the upstream of the photodetector 25 to perform a convergence or astigmatism generation for the reflected light.

The semiconductor laser emits a laser beam to the half mirror 22 which reflect it to the collimator lens 23. The collimator lens 23 converts the divergent laser beam to a parallel laser beam and pass it to the complex objective lens 24. The hologram lens section 24b mainly divides the light beam into a zero-order diffraction light and a first-order diffraction light through its diffracting function. These diffracted light beams are converged toward the optical disc 30 by the converging lens 24a, so that a light spot is formed on a pit train of the information recording surface of the optical disc 30. During the reproduction of DVD, the zero-order diffraction light diffracted by the hologram lens 24b transmits through the hologram lens together with the ambient transmission light, like passing through a parallel flat glass, and is converged onto the optical disc at a numerical aperture NA of 0.6 by the setting of the distance between the objective lens and the optical disc, thereby forming a small light spot as shown in FIG. 2, so as to suppers the influence of cross-talk during the playback of the DVD.

When a CD is reproduced, by using the first-order diffraction light diffracted by the hologram lens 24b, the hologram lens 24b functions as a concave toric lens to provide an astigmatism to the first-order diffraction light, so that the complex objective lens 24 forms a light spot 13a expanded in the radius direction on the optical disc 30.

Almost of the reflection light from the light spot of the information recording surface 10 of the optical disc 30 enters the complex objective lens 24 and then passes through the collimator lens 23, the half mirror 22 and the receiving optics system 27 onto a light receiving portion of the photodetector 25.

When an astigmatism generator and a four light-receiving-surface elements are used for the receiving optics system 27 and the photodetector 25 respectively, a servo-control for the complex objective lens 24 is performed as follows:

When a spot image is formed near the center of the four light-receiving-surface elements by the reflected light, the photodetector supplies an electric signal to a demodulating circuit 32a and an error detecting circuit 32b in accordance with portions of the spot image formed on the four light-receiving-surface elements. The demodulating circuit 32a reproduces a recorded signal on the basis of the electric signal. The error detecting circuit 32b generates a focusing error signal, a tracking error signal, another servo signal, and the like on the basis of the electric signal to supply them to the corresponding actuators through an actuator driving circuit 33. The actuator driving circuit 33 drives the complex objective lens 24 and the like actuators under the servo-control in accordance with the driving signals.

In this way, the optical pickup device having the complex objective lens reads the optical disc by forming the light spot on the recording surface of the optical disc while controlling the position of the light spot relative to a track of the recording surface.

Figure 6:
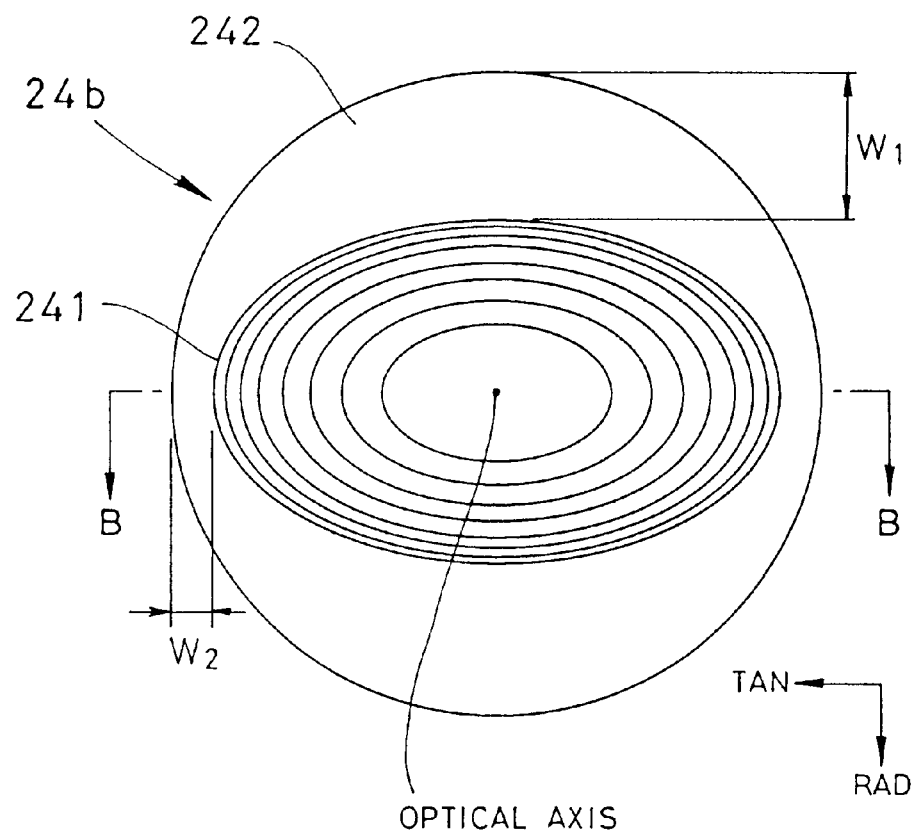
FIG. 6 is a front view seen from the optical axis of a hologram lens section in the two-focal-point complex objective lens of an embodiment for reading an optical recording medium.
Figure 7:
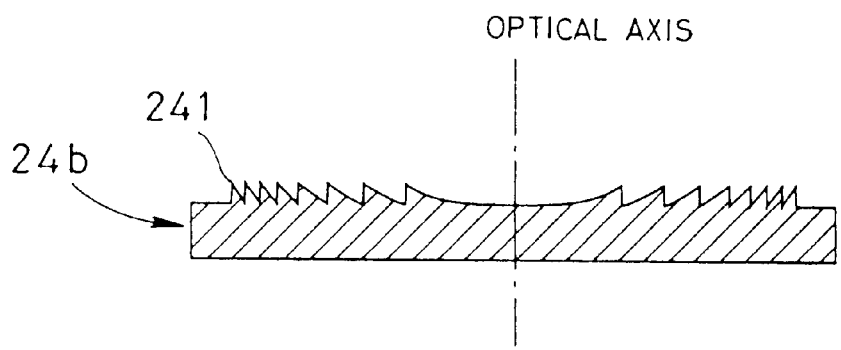
FIG. 7 is a cross sectional view taken off along the line BB appearing in FIG. 6.

Next, the diffracting function of the hologram lens section 24b will be described. Namely, there is described in detail that the hologram lens section has a diffraction grating pattern being formed in such a manner that a first-order diffraction light of the light beam caused by the hologram lens section and converged on the recording surface has a first numerical aperture existing in a direction intersecting the track extending direction and a second numerical aperture existing in the track extending direction wherein the first numerical aperture is less than the second numerical aperture. FIG. 6 and FIG. 7 are a front view seen from the optical axis of the hologram lens section and a cross sectional view thereof respectively. As seen from FIG. 6, the hologram lens section 24b comprises an ellipsoidal diffraction grating pattern 241 consisting of a plurality of ellipsoidal grooves concentrically formed on one side of a transparent flat plate. The center of symmetry in the ellipsoidal diffraction grating pattern is coaxially placed at the optical axis of the converging lens section. the hologram lens section 24b also comprises a transparent flat portion 242 sandwiching the ellipsoidal diffraction grating pattern without any ellipsoidal diffraction grating pattern. As seen from FIG. 7, the cross-section of the ellipsoidal diffraction grating pattern 241 has a saw blade shape. The ellipsoidal diffraction grating pattern 241 functions as a concave toric lens like e a concave micro Fresnel lens. In the transparent flat portion 242, the width in the radial direction $W_1$ is greater than the width in the tangential direction $W_2$ with respect to a traverse cross-section of the transmitting light beam $(0=<W_2<W_1)$, so that the diffraction grating pattern 241 is arranged at the optical axis of the light beam the portion of which passes through the transparent flat portion 242.

Figure 8:
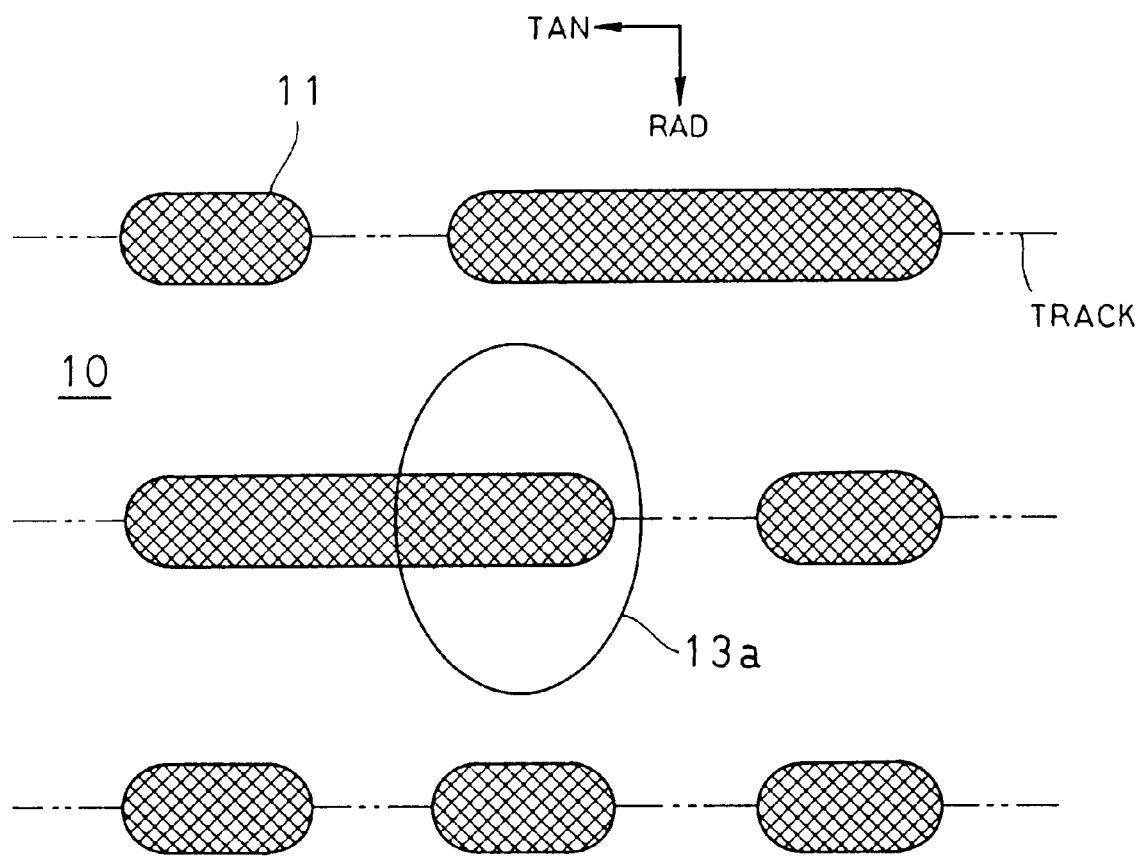
FIG. 8 is an enlarged plan view showing the recording surface of a CD with a light spot formed by the optical pickup device of the invention.
Figure 9A:
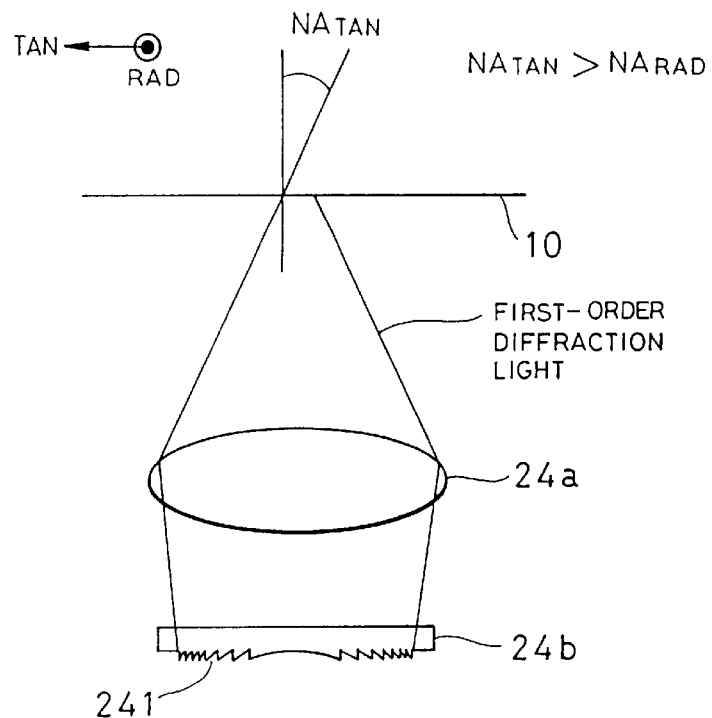
FIGS. 9A and 9B are schematic constructional diagrams showing a two-focal-point complex objective lens for reading a CD which is seen from the radial and tangential directions of the CD respectively.
Figure 9B:
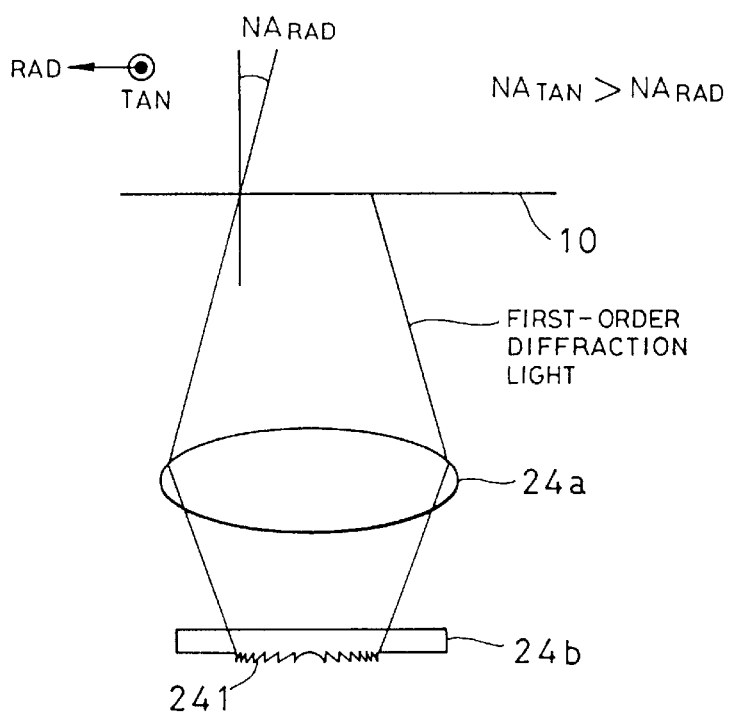

As shown in FIG. 8, by using the hologram lens section 24b including the ellipsoidal diffraction grating pattern in the optical pickup device, the light spot 13a is formed on the recording surface 10 of the optical disc so as to be expanded in light intensity about the pits 11 in the radial direction. In other words, the hologram lens section 24b of the complex objective lens 24a functions as a concave toric lens having a curved surface formed in such a manner that a radius of curvature in a meridional plane is different from that of the sagittal plane and sequentially increases through from the meridional radius of curvature to the sagittal's. The hologram lens section 24b is set in such a manner that the meridional plane corresponds to the radial direction of the optical disc and the sagittal plane corresponds to the tangential direction of the optical disc. Consequently, by the combination of the hologram lens section 24b and the converging lens section 24a, i.e., the complex objective lens 24a, a numerical aperture $NA_{TAN}$ in the tangential direction plane on the recording surface 10 of the optical disc as shown in FIG. 9A is grater than the numerical aperture $NA_{RAD}$. in the radial direction plane as shown in FIG. 9B.

Example with the Numerical Apertures $NA_{RAD}$ and $NA_{TAN}$ Calculated in the Complex Objective Lens It is first considered that a factor of σ specifies a light intensity distribution over the entrance pupil of the complex objective lens in the system for a DVD. Assuming that, when an incident laser beam with Gaussian distribution enters the pupil of the objective lens, the central light intensity is equal to $I_0$ (=1), and a light intensity over the pupil is Im.

In addition, $Im/I_0=Im=\exp(-\sigma)$ represents a light intensity at the rim.

The Gaussian distribution $\psi(\gamma)=\exp(-2\gamma^2)$ is $\psi(\gamma)=0.5$ at a light intensity 0.5 (half value). Thus, $\gamma_0=[-(\ln 0.5)/2]^{1/2}$ is given. A radiation angle $\theta_0$ defines a half width at half maximum of the light beam irradiated from the semiconductor laser.

The normalized pupil radius γ above may be written as $NA=\sin\theta\,\gamma$ with respect to a radiation angle θ of the light beam.

Now, a light intensity at an optional radiation angle θ is considered under the conditions $NA_0=\sin\theta_0\,\gamma_0$, and $\theta_0$ is a half width at half maximum light beam. The factor of σ specifying a light intensity distribution is given as follows:

$$NA_0 \cdot \gamma_0 = NA \cdot \gamma$$

$$\gamma = \gamma_0 \times NA/NA_0$$

$$\therefore \sigma = 2\gamma^2$$

$$= 2\gamma^2 \times (NA/NA_0)^2$$

$$= 2 \times [-\ln(0.5)/2] \times (NA/NA_0)^2$$

$$= -\ln 0.5 \times (NA/NA_0)^2$$

A radiation angle of the light beam from the semiconductor laser is generally as follows:

$$\theta_{RAD} = \theta \| (\text{parallel to the junction plane}) = 4°$$

$$\theta_{TAN} = \theta \perp (\text{vertical to the junction plane}) = 15.5°$$

at the half width at half maximum in the far field pattern.

Whilst, assuming under the conditions of a numerical aperture on the optical disc side $NA_{obj} = 0.6$ for DVD, an objective lens with a focal length on the optical disc side $f_{obj} = 3.3$ and a focal length on the semiconductor laser side $f_{LD} = 19.09$ is used, then a numerical aperture on the semiconductor laser side $NA_{LD}$ is given by $$NA_{LD} = NA_{obj} \times f_{obj}/f_{LD}$$

$$= 0.1037$$

At this time, a factor of σ specifying light intensity distribution over the entrance pupil of the objective lens in the tangential direction is obtained by $$\sigma = -\ln 0.5 \times (0.1037/\sin \theta_0)^2$$

$$= 1.532 \equiv \sigma_{TAN}$$

Similarly, a factor of $\sigma_{RAD}$ in the radial direction is calculated in the same manner described above, resulting in $$\sigma_{RAD} = 0.104.$$

Therefore, the light intensities $Im_{TAN}$ and $Im_{RAD}$ are calculated as follows:

$$Im_{TAN} = \exp(-\sigma_{TAN}) = 0.216$$

$$Im_{RAD} = \exp(-\sigma_{RAD}) = 0.901$$

As a result, an anisotropic light intensity distribution occur in the tangential and the radial directions.

When the laser beam having such an anisotropic light intensity distribution enters the objective lens, the light intensity distribution of laser beam converged on the optical disc is narrow in the radial direction and wide in the tangential direction as shown in FIG. 2.

Next, it is considered that a factor of σ specifies a light intensity distribution over the entrance pupil of the objective lens in the system for CD. Assuming that an incident laser beam with the same distribution is used during the playback of a CD under the same conditions as the DVD system described above, excepting NA=0.375 for CD, then factors of σ vary as follows:

$$\sigma_{TAN} = 0.599$$

$$\sigma_{RAD} = 0.041$$

Therefore, the light intensities $Im_{TAN}$ and $Im_{RAD}$ for the CD are calculated as follows:

$$Im_{TAN} = \exp(-0.599) = 0.550$$

$$Im_{RAD} = \exp(-0.041) = 0.960$$

In this case, the light intensity distribution of laser beam converged on the optical disc is a little wider in the tangential direction than in the radial direction.

Figure 3:
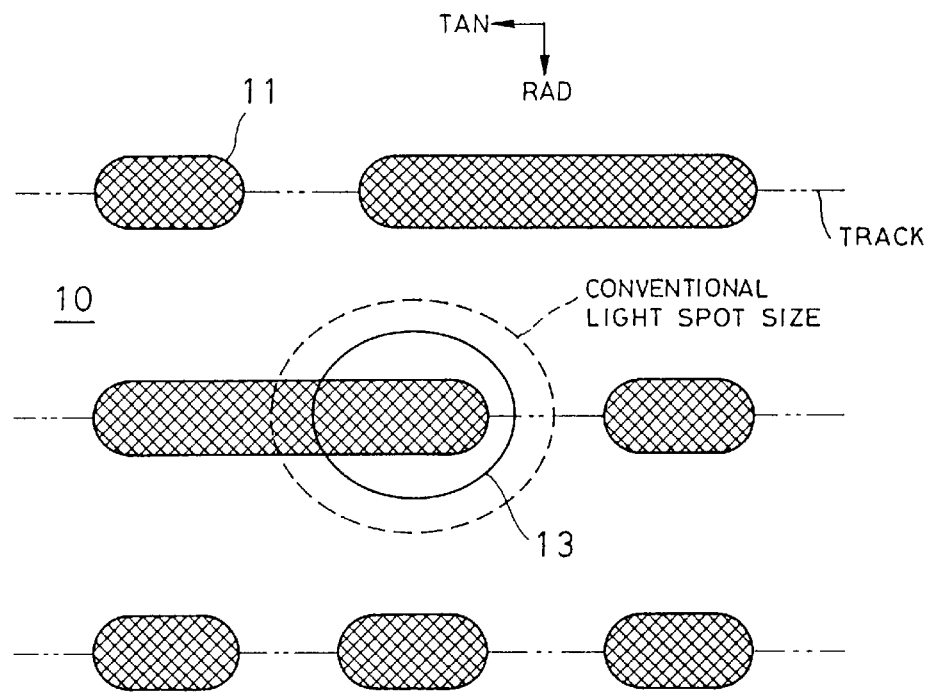
FIG. 3 is an enlarged plan view showing the recording surface of a CD.
Figure 4:
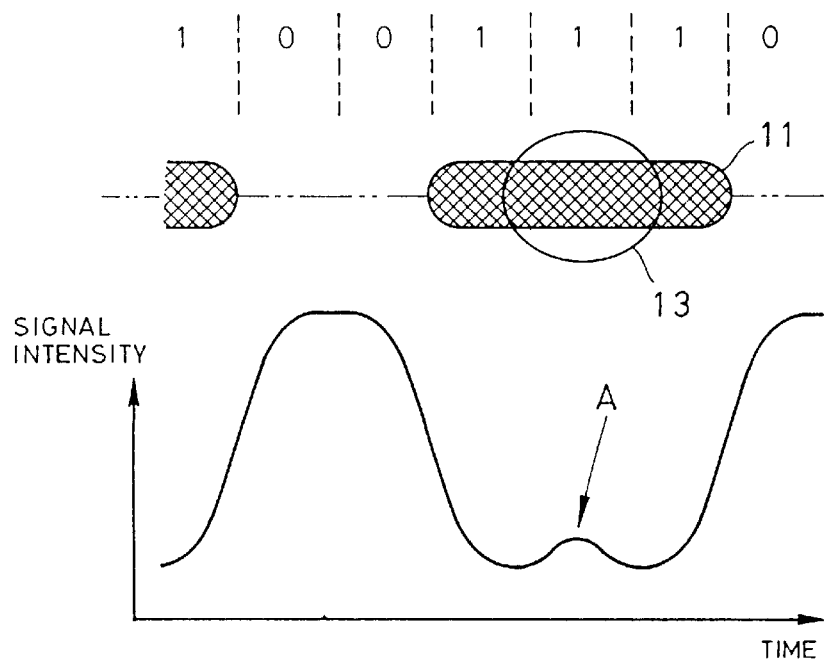
FIG. 4 is a diagram showing the relationship between the pit data of the CD and the intensity curve of signal read by the conventional two-focal-point optical pickup device.

When CD is playbacked by a laser beam having such an light intensity distribution the pits, the light intensity irradiated around the long and wide pit formed on the CD is insufficient, so that, as shown in FIG. 4, a glitch or bump A occurs in the signal intensity curve of the output from the optical pickup device.

Thus, the inventors have devised to make the width of the light spot in the radial direction larger than that of in the tangential direction by means of setting the groove pitch of an ellipsoidal diffraction grating pattern in the radial direction of the hologram lens section larger than that of in the tangential direction. For example, the inventors have made a complex optical device with an ellipsoidal diffraction grating pattern is fabricated in such a manner that a first-order diffraction light of the light beam caused by the diffraction grating pattern and converged on the CD has a first numerical aperture $NA_{RAD} = 0.25$ existing in a direction intersecting the track extending direction (i.e., a radial direction) and a second numerical aperture $NA_{TAN} = 0.375$ existing in the track extending direction. Namely, the diffraction grating pattern is anisotropic and different in the radial and tangential directions so that the first numerical aperture on the optical disc side is less than the second numerical aperture.

Then, the factors of σ and light intensities $Im_{TAN}$ and $Im_{RAD}$ for the CD are calculated as follows:

$$\sigma_{TAN} = 0.599$$

$$\sigma_{RAD} = 0.018$$

$$Im_{TAN} = 0.550$$

$$Im_{RAD} = 0.982$$

By using the hologram lens section including the ellipsoidal diffraction grating pattern in the optical pickup device, the light spot 13*a* is formed on the recording surface 10 of the optical disc, as shown in FIG. 8, so as to be expanded in light intensity about the pits 11 in the radial direction. As a result, the sufficient irradiated light intensity on the light spot of the optical disc has canceled the generation of glitch or bump in reproduced signal during the playback of CD.

Example of Other Hologram Lens Sections

Figure 10:
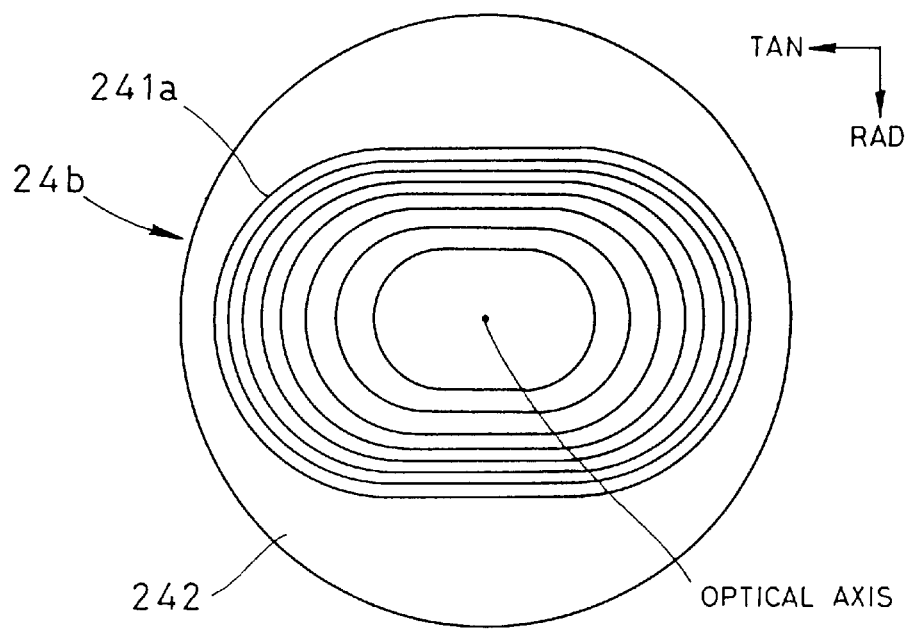
FIG. 10 is a front view seen from the optical axis of a hologram lens section in the two-focal-point complex objective lens of another embodiment for reading an optical recording medium.
Figure 11:
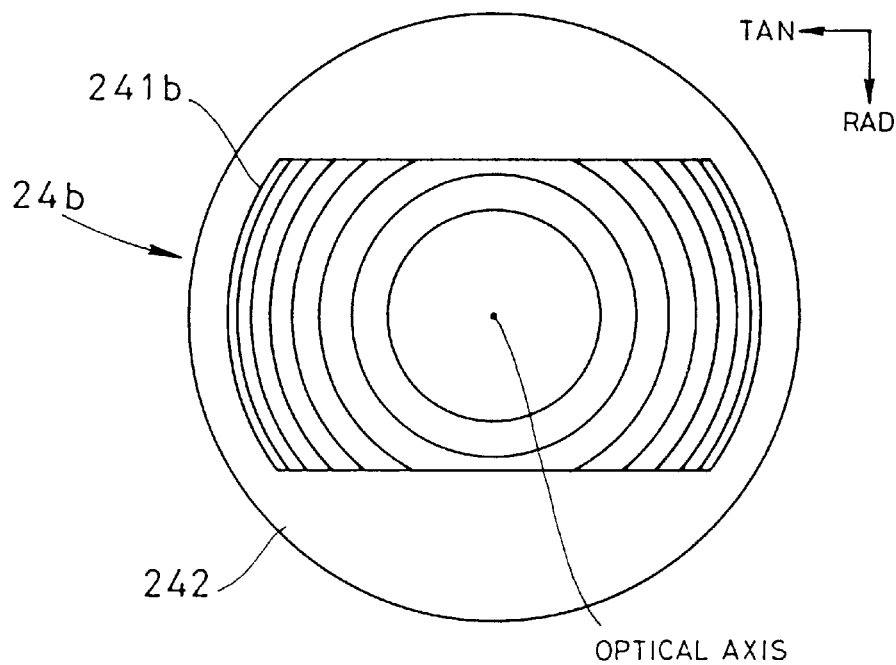
FIG. 11 is a front view seen from the optical axis of a hologram lens section in the two-focal-point complex objective lens of another embodiment for reading an optical recording medium.

In addition to the above example in which the ellipsoidal diffraction grating pattern consisting of a plurality of elliptic diffraction grooves anisotropically formed on the transparent flat plate employed for the hologram lens section 24*b*, as shown FIG. 10, an oval pattern 241*a* may be used for the diffraction grating pattern as being anisotropic in the radial and tangential direction in such a manner that the longitudinal axis of the oval pattern is aligned with the tangential direction of the optical disc. Furthermore, as shown in FIG. 11, a double side cut circular pattern 241*b* may be also utilized, which is formed by eliminating two symmetrical portion with the optical axis from a circular diffraction grating pattern functioning as a concave micro Fresnel lens, in such a manner that the longitudinal axis of the oval pattern is aligned with the tangential direction of the optical disc. These both example are able to expand the light intensity of the light spot about the pit of the optical disc in the radial direction. The variety of the diffraction grating pattern of the hologram lens section may be adopted to adjust the light intensity distribution in the light spot for the complex objective lens for reading an optical recording medium.

The hologram lens may be formed of an optical glass or plastics such as polymetylmethacrylate (PMMA). The replica of the hologram lens may be formed thorough an injection-molding method, a photo-polymer method by using a die with the diffraction grating pattern formed by a super precise lathing machine such as a diamond turning machine.

Moreover, other than to use individual converging lens and the hologram lens arranged to a cylindrical holder so as to be away from each other at a predetermined distance in the above example, there is employed a single complex objective lens comprises a refracting convex surface on one side surface and a hologram lens of the specific diffraction grating pattern on the other side, as a monolithic piece.

Furthermore, the optical pickup device according to the invention can converge the light beams, at the same time, onto two-layered recording surfaces in the optical disc included in the DVD specification respectively.

In this way, the optical pickup device according to the invention comprises; a hologram lens section having an elliptic diffraction grating disposed on the incident side of the laser beam and at least two transparent flat portions symmetrically sandwiching the elliptic diffraction grating with respect to the light beam; and a converging lens disposed on the irradiating side of the laser beam. The hologram lens of elliptic diffraction grating and the converging lens are coaxially arranged with the incident laser light coinciding with the normal lines of the main surfaces thereof. The area of the elliptic diffraction grating of the hologram lens section is smaller than an area of traverse cross-section of the incident laser beam to allow the portion of the incident laser beam to pass the two transparent flat portions.

What is claimed is:

1. An optical pickup device for irradiating a light beam emitted from a light source onto an optical recording medium to form a light spot on a track of a recording surface of the optical recording medium to read the optical recording medium while controlling the position of the light spot relative to the track of the recording surface, comprises:

a converging lens section coaxially disposed in an optical axis of the light beam to converge the light beam onto the recording surface; and a hologram lens section coaxially disposed in the optical axis of the light beam to diffract the light beam, wherein said hologram lens section has a diffraction grating pattern being formed in such a manner that a first-order diffraction light of the light beam caused by said hologram lens section and converged on said recording surface has a first numerical aperture existing in a direction intersecting a track extending direction and a second numerical aperture existing in the track extending directions, wherein the first numerical aperture is less than the second numerical aperture, wherein said diffraction grating pattern is an oval diffraction grating pattern consisting of a longitudinal parallel-line diffraction grating pattern and two semi-circular diffraction grating patterns connected to both ends of the parallel-line diffraction grating pattern which are symmetrically formed with respect to the optical axis of the light beam, and wherein said oval diffraction grating pattern is symmetrically formed with respect to the optical axis of the light beam so as to have a longest width corresponding to the track extending direction which is greater than a shortest width of the pattern corresponding to the direction intersecting the track extending direction within a traverse cross-section of transmitting light beam.

2. An optical pickup device according to claim 1, wherein said converging lens section and said hologram lens section are integrally formed as a single complex objective lens which comprises a refracting convex surface on one side surface and a hologram lens having said oval diffraction grating pattern on another side.

* * * * *